United States Patent [19]

Makino et al.

[11] 4,366,297

[45] Dec. 28, 1982

[54] PROCESS FOR PRODUCING OLEFINIC COPOLYMER RUBBER WITH IMPROVED TITANIUM COMPOUND CONTAINING CATALYST SYSTEM

[75] Inventors: Kenya Makino, Kuwana; Hideo Sakurai; Masaru Watanabe, both of Yokkaichi; Toshiyuki Nishimura, Kameyama, all of Japan

[73] Assignee: Japan EP Rubber Co., Ltd., Mie, Japan

[21] Appl. No.: 200,066

[22] Filed: Oct. 23, 1980

[30] Foreign Application Priority Data

Oct. 23, 1979 [JP] Japan ................ 54-135933
Oct. 23, 1979 [JP] Japan ................ 54-135934
Oct. 23, 1979 [JP] Japan ................ 54-135935
Apr. 24, 1980 [JP] Japan ................ 55-53556

[51] Int. Cl.$^3$ ............................................. C08F 4/64
[52] U.S. Cl. ........................... 526/119; 252/429 B; 252/429 C; 252/431 R; 526/122; 526/142; 526/282; 526/283; 526/336; 526/348
[58] Field of Search ................... 526/142, 119, 122

[56] References Cited

U.S. PATENT DOCUMENTS 4,110,248  8/1978  Sandis et al. ............ 526/142
4,195,069  3/1980  Kortbeek et al. ......... 526/142
4,269,732  5/1981  Kortbeek et al. ......... 526/142

FOREIGN PATENT DOCUMENTS 1492864  11/1977  United Kingdom .

OTHER PUBLICATIONS

Translated Claim, Japanese Kokai No. 51381/74 (5-18-74).
Translated Claim, Japanese Kokai No. 16298/76 (2-9-76).
Translated Claim, Japanese Kokai No. 76196/76 (7-1-76).
Translated Claim, Japanese Kokai No. 78691/77 (7-2-77).
Translated Claim, Japanese Kokai No. 148490/77 (12-9-77).
Translated Claim, Japanese Kokai No. 152485/77 (12-17-77).
Translated Claim, Japanese Kokai No. 153896/77 (12-21-77).
Translated Claim, Japanese Kokai No. 104687/78 (9-12-78).

*Primary Examiner*—Stanford M. Levin
*Attorney, Agent, or Firm*—Wenderoth, Lind & Ponack

[57] ABSTRACT

In a process for producing a rubber olefin copolymer which comprises random copolymerization of at least two olefins in the presence of a catalyst composed of (A) a titanium compound and (B) an organometallic compound of a metal of Groups I to III of the periodic table, the improvement wherein the titanium compound (A) is a liquid product obtained by treating a titanium tetrahalide of the general formula $TiX_4$ in which X represents Cl, Br or I in a hydrocarbon, a halogenated hydrocarbon or a mixture of both in the presence of an ether with at least one member selected from the group consisting of (1) an organoaluminum compound, (2) an organomagnesium compound and (3) a combination of hydrogen and at least one metal or metal compound selected from the group consisting of metals of Group IB, IIB, IVB and VIII of the periodic table, compounds of metals of Group VIII of the periodic table, cuprous chloride, titanium hydride and zirconium hydride.

13 Claims, 4 Drawing Figures

FIG. 1

PROCESS FOR PRODUCING OLEFINIC COPOLYMER RUBBER WITH IMPROVED TITANIUM COMPOUND CONTAINING CATALYST SYSTEM

BACKGROUND OF THE INVENTION

This invention relates to a process for producing an olefinic copolymer rubber having good processability, a high tensile strength and a highly random molecular arrangement in good yields using a solvent-soluble Ziegler-type catalyst.

Catalyst systems composed of homogeneous vanadium compounds and organoaluminum compounds have been frequently used for production of rubbery copolymers by random copolymerization of at least two olefins. In general, however, these homogeneous vanadium catalysts are very liable to undergo deactivation during polymerization and do not have high activity at a temperature of 30° to 60° C. which is a practical polymerization temperature.

On the other hand, catalyst systems composed of titanium compounds and organoaluminum compounds are generally known to undergo less deactivation in polymerization. Use of these titanium compounds, however, tends to result in homopolymerization of the olefins to give a mixture of homopolymers. Or even if copolymerization does occur, block copolymers tend to form. Accordingly, the production of rubbery copolymers by titanium-type catalysts has not been commercially successful.

Some patent documents were recently published which are directed to the production of ethylene/alpha-olefin copolymer rubbers with titanium-type catalysts (for example, Japanese Laid-Open Patent Publications Nos. 51381/74, 117886/75 and 104687/78). The methods disclosed in these patent documents involve random copolymerization of ethylene with an alpha-olefin using a catalyst composed of (i) a solid titanium catalyst component consisting of a titanium compound supported on a carrier and (ii) an organoaluminum catalyst component. Since the resulting copolymer does not have a highly random molecular arrangement, it deposits partly on the hydrocarbon solvent used in the polymerization. It is difficult therefore to obtain rubbery olefinic copolymers by solution polymerization using the catalysts suggested in these patent documents. Moreover, the resulting copolymers are plastics, and are difficult to use in the field of rubbers.

The present inventors therefore worked on a process which involves using a titanium compound in solution instead of a solid titanium-type catalyst, and found that when at least two olefins are copolymerized using a catalyst composed of (a) a titanium compound being soluble in an organic solvent and having the ability to catalyze polymerization of olefins, such as titanium tetrachloride, titanium triacetylacetonate or tetrabutoxy titanium and (b) an organoaluminum compound, a mixture of homopolymers of the olefins or a block copolymer of the olefins tends to form and a rubbery copolymer of the olefins cannot be obtained.

The present inventors further worked on a process which involves using a catalyst a liquid titanium compound obtained by reducing titanium tetrachloride while maintaining it liquid.

A method for preparing such a liquid titanium compound is known, for example, from Japanese Laid-Open Patent Publications Nos. 16298/76, 76196/76 and 148490/77 which specifically disclose a method comprising reducing titanium tetrachloride with an organoaluminum compound in a hydrocarbon solvent in the presence of an ether. Japanese Laid-Open Patent Publications Nos. 78691/77, 152485/77 and 153896/77 disclose a method which comprises reducing titanium tetrachloride with an organomagnesium compound in an aromatic hydrocarbon solvent in the presence of an ether. In the methods disclosed in these patent documents, the liquid reduction product of titanium tetrachloride so formed is heated, or a liberating agent is added to it to precipitate titanium trichloride which is then separated from the ether to use it as a catalyst for stereospecific polymerization of propylene. In the liquid reduction product of titanium tetrachloride, the ether is present in an amount of at least 1 mole per mole of titanium, and it has been known heretofore that when titanium is present together with at least one mole of an electron donor, its activity as a catalyst for polymerization of olefins is very low or does not exist at all.

SUMMARY OF THE INVENTION

It is an object of this invention therefore to provide a highly active Ziegler-type catalyst which can afford a rubbery olefin copolymer having a highly random molecular arrangement, good processability and a high tensile strength.

The present inventors made investigations in order to achieve the above object, and found that when a liquid product obtained by reducing a titanium tetrachloride in a hydrocarbon solvent in the presence of an ether is combined with an organometallic compound of a metal of Groups I to III of the periodic table such as an organoaluminum compound to form a catalyst, the catalyst exhibits very high activity and a substantially amorphous rubbery elastic copolymer having a highly random molecular arrangement, good processability and a high tensile strength can be obtained.

The present inventors also found that a catalyst composed of an organometallic compound of a metal of Groups I to III of the periodic table and a liquid product obtained by reducing a titanium tetrahalide in a halogenated hydrocarbon solvent in the presence of ether exhibits very high catalytic activity and markedly increases the random molecular arrangement and gives a substantially amorphous rubbery elastic copolymer having a highly random molecular arrangement, good processability and a high tensile strength.

The present inventors also worked on a method for obtaining a liquid product by reducing titanium tetrachloride with hydrogen, Consequently, they developed a method for obtaining such a liquid product which comprises treating a titanium tetrahalide in an organic solvent in the presence of an ether and at least one metal of Groups IB, IIB, IVB and VIII of the periodic table or at least one of compounds of Group VIII of the periodic table, cuprous chloride, titanium hydride and zirconium hydride with (1) hydrogen or (2) both hydrogen and an organomagnesium compound and/or an organoaluminum compound. They found that a catalyst composed of the resulting liquid product and an organometallic compound of a metal of Groups I to III of the periodic table exhibits very high activity in the copolymerization of at least two olefins, and can give a substantially amorphous rubbery elastic copolymer having a highly random molecular arrangement, good processability and a high tensile strength.

DETAILED DESCRIPTION OF INVENTION

Thus, the present invention provides, in a process for producing a rubbery olefin copolymer, by random copolymerization of at least two olefins in the presence of a catalyst composed of (A) a titanium compound and (B) an organometallic compound of a metal of Groups I to III of the periodic table, the improvement wherein the titanium compound (A) is a liquid product obtained by treating a titanium tetrahalide of the general formula $TiX_4$ in which X represents Cl, Br or I in a hydrocarbon, a halogenated hydrocarbon or a mixture of both in the presence of an ether with at least one member selected from the group consisting of (1) an organoaluminum compound, (2) an organomagnesium compound and (3) a combination of hydrogen and at least one metal or metal compound selected from the group consisting of metals of Group IB, IIB, IVB and VIII of the periodic table compounds of metals of Group VIII of the periodic table, cuprous chloride, titanium hydride and zirconium hydride.

Titanium tetrachloride, titanium tetrabromide, titanium tetraiodide and mixtures thereof may be used as the titanium tetrahalide in the production of the component (A) of the catalyst used in this invention.

The ether used in the production of the component (A) of the catalyst is expressed by the general formula $R^1OR^2$ ... (1) wherein $R^1$ and $R^2$, independently from each other, represent an alkyl, alkenyl or aralkyl group having 1 to 20 carbon atoms, preferably 2 to 12 carbon atoms.

Specific examples of the ether are given below.

(1) Dialkyl ethers

Diethyl ether, di-n-propyl ether, di-n-butyl ether, di-i-butyl ether, di-n-hexyl ether, di-n-octyl ether, di-2-ethyl-hexyl ether, di-n-decyl ether, di-n-dodecyl ether, di-n-tridecyl ether, hexyl octyl ether, and dicyclohexyl ether.

(2) Dialkenyl ethers bis(1-Octenyl) ether, bis(1-decenyl) ether and 1-octenyl-9-decenyl ether.

(3) Diaralkyl ether bis(Benzyl) ether (4) Alkylalkenyl ethers n-Octyl-1-decenyl ether and n-decyl-1-decenyl ether.

(5) Alkylaralkyl ethers n-Octyl benzyl ether and n-decyl benzyl ether.

(6) Alkenylaralkyl ether

1-Octenyl benzyl ether.

Among these ethers, those of the general formula (1) in which $R^1$ and $R^2$ are linear alkyl groups are especially preferred.

Suitable organoaluminum compounds used as the reducing agent for the titanium tetrahalide are those of the general formula $$AlR_mX_{3-m} \quad (2)$$

wherein R represents a hydrogen atom or a hydrocarbon group having 1 to 12 carbon atoms, X represents a halogen atom or an alkoxy group having 1 to 12 carbon atoms, and m is a number represented by $1 \leq m \leq 3$.

Suitable organomagnesium compounds used as the reducing agent for the titanium tetrahalide are expressed by the general formula $$RMgX \quad (3)$$

wherein R represents a hydrocarbon group having 1 to 20 carbon atoms, preferably 1 to 12 carbon atoms, and X represents the same hydrocarbon group as represented by R, a hydrocarbon group having 1 to 20 carbon atoms, preferably 1 to 12 carbon atoms, bonded to Mg through a nitrogen, oxygen or sulfur atom, or a halogen atom.

Preferred organomagnesium and organoaluminum compounds are those of the above formulae in which R represents a linear alkyl group or an alkenyl group. Two or more of the organoaluminum compounds or the organomagnesium compounds may be used in combination.

Specific examples of the organoaluminum compounds include triethyl aluminum, tri-n-propyl aluminum, tri-i-butyl aluminum, tri-n-octyl aluminum, tri-(2-methylpentyl) aluminum, di-i-butyl aluminum hydride, ethyl aluminum sesquichloride, diethyl aluminum chloride, ethyl aluminum dichloride, diethyl aluminum ethoxide and diethyl aluminum iodide. Among these organoaluminum compounds, trialkyl aluminums are especially preferred.

Examples of the organomagnesium compounds include diethyl magnesium, dibutyl magnesium, ethyl magnesium chloride, butyl magnesium chloride, octyl magnesium chloride, ethyl magnesium bromide, butyl magnesium bromide, ethyl magnesium iodide, butyl magnesium iodide, octyl magnesium iodide, ethyl n-butoxy magnesium, n-butoxy magnesium, n-butyl n-butoxy magnesium, diethyl amino ethyl magnesium, diethyl amino n-butyl magnesium, di-n-butylamino n-butyl magnesium, ethyl n-butylthiomagnesium, and n-butyl n-butylthiomagnesium.

In reducing the titanium tetrahalide with the above-exemplified organoaluminum or organomagnesium compound, it is possible to use jointly a small amount of an organometallic compound of a metal of Groups I to III of the periodic table other than aluminum and magnesium, such as an organo-lithium, sodium, potassium, calcium, barium or boron compound.

To promote solubilization of the reduction product of the titanium tetrahalide, a small amount of an inorganic halogen compound may be added. Examples of the inorganic halogen compound are $Br_2$, $I_2$, $ICl$, $IBr$, $ICl_3$, $PCl_3$, $PCl_5$, $POCl_3$, $S_2Cl_2$, $SCl_2$, $SOCl_2$ and $PSCl_2$.

Most suitable hydrocarbon solvents that can be used in preparing the catalyst component (A) are saturated aliphatic hydrocarbons having 5 to 20 carbon atoms such as n-pentane, n-hexane, n-heptane, n-octane, n-decane and liquid paraffins. Saturated alicyclic hydrocarbons having 5 to 12 carbon atoms such as cyclohexane and methylcyclohexane, and aromatic hydrocarbons having 6 to 9 carbon atoms such as benzene and toluene may also be used. Two or more kinds of these hydrocarbons may be used together.

When the hydrocarbon solvent is used, it is preferred to use ethers of formula (1) in which $R^1$ and $R^2$ each have at least 6 carbon atoms.

Examples of the halogenated hydrocarbon solvent include halogenation products of saturated aliphatic hydrocarbons having 1 to 12 carbon atoms, halogenation products of saturated alicyclic hydrocarbons having 5 to 12 carbon atoms and halogenated products of aromatic hydrocarbons having 6 to 9 carbon atoms. Specific examples are given below. These halogenated hydrocarbon solvents may be used in a combination of two or more.

(1) Halogenation products of saturated aliphatic hydrocarbons

Methylene chloride, chloroform, carbon tetrachloride, monochloroethane, ethyl iodide, 1,2-dichloroethane, 1,1-dichloroethane, 1,1,2-trichloroethane, 1,1,2,2-tetrachloroethylene, n-butyl chloride, and n-butyl iodide.

(2) Halogenation products of saturated alicyclic hydrocarbons

Chlorocyclohexane.

(3) Halogenation products of aromatic hydrocarbons

Chlorobenzene, bromobenzene, iodobenzene and orthochlorobenzene.

Among these halogenated hydrocarbons, the halogenation products of saturated aliphatic hydrocarbons are especially preferred.

A mixture of the hydrocarbon solvent and the halogenated hydrocarbon solvent may also be used.

The reduction of the titanium tetrahalide with the organoaluminum or organomagnesium compound may be carried out by any desired procedure so long as it is done in the presence of the aforesaid ether. For example, the following procedures may be employed.

(a) Addition of the organoaluminum or organomagnesium compound to a solution containing the titanium tetrahalide and the ether.

(b) Addition of a liquid material composed of the ether and the organoaluminum or organomagnesium compound to the titanium tetrahalide.

(c) Addition of a liquid material composed of the ether and the organoaluminum or organomagnesium compound to a liquid material composed of the titanium tetrahalide and the ether.

Contacting of the titanium tetrahalide with the organoaluminum or organomagnesium compound is carried out usually at a temperature of $-40°$ C. to $80°$ C., preferably from $-30°$ C. to $50°$ C. When the contacting temperature is low, the product may be aged by raising the temperature after contacting.

If desired, the reduction of the titanium tetrahalide with the organoaluminum or organomagnesium compound may be carried out in the presence of a small amount of an alpha-olefin such as propylene, butene-1 or hexene-1.

The mole ratio of the titanium tetrahalide to the ether used in these methods is preferably from 1:0.2 to 1:20, especially preferably form 1:0.5 to 1:5.

The mole ratio of the titanium tetrahalide to the organoaluminum or organomagnesium compound is expressed by the mole ratio of titanium to the organoaluminum compound of formula (2) or the organomagnesium compound of formula (3), and is from 1:0.2 to 1:10, preferably from 1:0.3 to 1:5, more preferably from 1:0.3 to 1:2.

In another embodiment, the catalyst component (A) of the catalyst used in this invention may also be prepared by reducing the titanium tetrahalide in the presence of the ether, the hydrocarbon or halogenated hydrocarbon solvent and at least one metal or metal compound selected from metals of Groups IB, IIB, IVB and VIII of the periodic table, compounds of metals of Group VIII of the periodic table, cuprous chloride, titanium hydride and zirconium hydride, using as a reducing agent hydrogen or both hydrogen and the organoaluminum compound and/or the organomagnesium compound.

Hydrogen is preferably of high purity. There is used hydrogen which contains less than 50 ppm, preferably less than 20 ppm, of oxygen or an oxygen-containing compound such as CO or $CO_2$.

Examples of the metals of Groups IB, IIB, IVB and VIII of the periodic table are copper, silver, zinc, titanium, zirconium, iron, cobalt, nickel, ruthenium, rhodium, palladium, iridium and platinum, alloys, powders, granules and sponges of these metals, and powders, granules, particles and pellets composed of these metals supported on carbon, alumina, silica, etc. The compounds of metals of Group VIII are, for example, the chlorides, oxides, hydrides, sulfates, sulfides, nitrates, etc. Specific examples include ferrous chloride, cobalt chloride, nickel chloride, palladium chloride, platinum chloride, rhodium chloride, iridium chloride, ferrous oxide, palladium oxide, platinum oxide, palladium sulfide, platinum sulfide, palladium sulfate, platinum sulfate, palladium nitrate, cobalt nitrate, rhodium nitrate, and platinum nitrate.

Compounds obtained by modifying these metals or metal compounds with small amounts of organic or inorganic compounds, for example tetrakis-triphenylphosphine palladium, biscyclooctadienyl nickel, products obtained by pulverizing them together with magnesium chloride, magnesium oxide, etc., may also be used in this invention as the aforesaid metals or metal compounds.

The metal compounds may be used as a mixture of two or more. The metals of groups VIII and the compounds thereof are especially preferred. Palladium, platinum, and compounds of these are most preferred.

The ether and hydrocarbon or halogenated hydrocarbon solvent used in the reduction of the titanium tetrahalide with hydrogen are the same as those exemplified hereinabove.

When hydrogen is used as a reducing agent, the catalyst component (A) can be prepared by various methods, examples of which are given below.

(1) Method comprising adding the titanium tetrahalide to the hydrocarbon and/or halogenated hydrocarbon in the presence of the ether and the metal of Group IB, IIB, IVB or VIII of the periodic table, a compound of a metal of Group VIII, cuprous chloride, titanium hydride or zirconium hydride, and passing hydrogen gas into the solution under atmospheric pressure.

(2) Method comprising adding the solvent, ether, the metal of Group IB, IIB, IVB or VIII or a compound of a metal of Group VIII, cuprous chloride, titanium hydride or zirconium hydride and the titanium tetrahalide to a pressure reactor, and forcing hydrogen gas into it.

(3) Method comprising contacting a solution of the titanium tetrahalide and the ether countercurrently with hydrogen gas under atmospheric or elevated pressure in the presence of the metal of Group IB, IIB, IVB or VIII of the periodic table, a compound of a metal of Group VIII, cuprous chloride, titanium hydride or zirconium hydride.

(4) Method comprising adding the titanium tetrahalide to the solvent in the presence of the ether and the metal of Group IB, IIB, IVB or VIII of the periodic table, a compound of a metal of Group VIII, cuprous chloride, titanium hydride or zirconium hydride, passing hydrogen gas through the solution under atmospheric pressure, and adding the organoaluminum compound and/or organomagnesium compound.

(5) Method comprising contacting the titanium tetrahalide with the organoaluminum compound and/or organomagnesium compound in the solvent in the presence of the ether, adding the metal of Group IB, IIB, IVB or VIII of the periodic table, a compound of a metal of Group VIII, cuprous chloride, titanium hydride or zirconium hydride, and passing hydrogen gas through the mixture under reduced pressure.

(6) Method comprising adding the solvent, the ether, the metal of Group IB, IIB, IVB or VIII, a compound of a metal of Group VIII, cuprous chloride, titanium hydride or zirconium hydride and the titanium tetrahalide to a pressure reactor, forcing hydrogen gas into the reactor to perform reaction, and thereafter adding the organoaluminum compound and/or organomagnesium compound.

(7) Method comprising contacting a solution of the titanium tetrahalide and the ether in the solvent under atmospheric or elevated pressure in the presence of the metal of Group IB, IIB, IVB or VIII, a compound of a metal of Group VIII, cuprous chloride, titanium hydride or zirconium hydride, and then adding the organoaluminum compound and/or organomagnesium compound.

The liquid product obtained by such a method may be directly used, or if desired, after separating the metal of Group IB, IIB, IVB or VIII, a compound of a metal of Group VIII, cuprous chloride, titanium hydride, or zirconium hydride.

Hydrogen may be used as a mixture with an inert gas such as nitrogen, argon or helium. The pressure under which hydrogen is contacted is preferably from atmospheric pressure to 100 kg/cm$^2$, and the temperature at which hydrogen is contacted is from $-50°$ C. to 200° C., preferably from $-30°$ C. to 150° C.

Preparation of the catalyst component (A) by contacting hydrogen gas with the titanium tetrahalide may be carried out in the presence of a small amount of an alpha-olefin such as propylene, butene-1 or hexene-1.

When the hydrocarbon solvent is used, it is preferred to use ethers of formula (1) which $R^1$ and $R^2$ each have at least 6 carbon atoms.

In the preparation of the catalyst component (A) using hydrogen, the mole ratio of the titanium halide to the ether is preferably from 1:0.2 to 1:20, especially preferably from 1:0.5 to 1:5. It is sufficient that the metal of Group IB, IIB, IVB or VIII, a compound of a metal of Group VIII, cuprous chloride, titanium hydride or zirconium hydride is present in a catalytic amount. Use of it in a large amount is uneconomical. Specifically, the mole ratio of the metal or metal compound to the titanium tetrahalide is from 0.00001 to 10, preferably from 0.0001 to 1. The mole ratio of the organoaluminum or organomagnesium compound to the titanium tetrahalide is from 0.05 to 0.9, preferably from 0.1 to 0.75. When the organomagnesium compound and the organoaluminum compound are used together, the mole ratio of the sum of these organometal compounds to the titanium tetrahalide is from 0.05 to 0.9, preferably from 0.1 to 0.75.

It is possible to add a tetravalent or pentavalent vanadium compound soluble in the hydrocarbon or halogenated hydrocarbon to the catalyst component (A) obtained in the aforesaid manner.

Examples of the tetravalent or pentavalent vanadium compound are vanadium tetrahalides, vanadium oxytrihalides, tris(acetylacetone) vanadium, vanadium oxyacetyl acetonate, and products obtained by treating these vanadium compounds with electron donors. The halogen is selected from chlorine, bromine and iodine. Among them, vanadium tetrachloride, vanadium oxytrichloride, and products obtained by treating them with alcohols are preferred.

The amount of the tetravalent or pentavalent vanadium compound added to the catalyst component (A) is such that the mole ratio of titanium to vanadium is 1:0.01–10, preferably 1:0.02–1.

The catalyst component (B) used in this invention is an organometallic compound of a metal of Groups I to III of the periodic table, such as organolithium compounds, organozinc compounds, organomagnesium compounds and organoaluminum compounds. Of these, the organoaluminum compounds are preferred. Generally, organoaluminum compounds of general formula (2) given hereinabove are suitable.

The ratio of the catalyst component (A) to the catalyst component (B), expressed by the atomic ratio of titanium to aluminum, is usually from 1:0.2 to 1:200, preferably from 1:1 to 1:50.

According to the process of this invention, at least two olefins are random-copolymerized in the presence of a catalyst composed of the components (A) and (B). Suitable olefins include ethylene, propylene, butene-1, 4-methylpentene-1, hexene-1, and octene-1. An olefin copolymer rubber can be produced by copolymerizing at least two such olefins.

These olefin monomers are used in such proportions that the content of an olefin unit which is the largest among those of the monomers constituting the copolymer rubber is not more than 80% by weight, preferably not more than 70% by weight.

The process of this invention is especially suitable for production of an ethylene/propylene copolymer rubber by copolymerizing ethylene and propylene.

In order to afford a copolymer rubber which can be easily vulcanized, a non-conjugated polyene monomer may be copolymerized with the olefin monomers. The non-conjugated polyene may be of any desired type, such as a bridged cyclic hydrocarbon compound, monocyclic compound, heterocyclic compound, aliphatic compound of spiro-type compound. Specific examples of the non-conjugated polyenes include dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, 5-(2'-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 1,4-hexadiene, 1,6-octadiene, and 6-methyl-1,5-heptadiene. Among these non-conjugated polyenes, 5-ethylidene-2-norbornene and dicyclopentadiene are preferred.

The polymerization temperature is usually 0° to 120° C., preferably 20° to 80° C. The polymerization pressure is usually from normal atmospheric pressure to 50 kg/cm$^2$. The polymerization is generally carried out conveniently by a solution polymerization method by which the polymerization is carried out in a solvent for the copolymer. A hydrocarbon solvent such as n-hexane and n-heptane is frequently used as the solvent for the polymerization. The copolymerization may be carried out batchwise or continuously. The molecular weight of the copolymer can be controlled as required by using hydrogen.

The following Examples illustrate the present invention more specifically.

The various properties of the copolymer in these examples were measured by the following methods.

Mooney viscosity

The sample is pre-heated for 1 minute, and its Mooney viscosity is measured for 4 minutes at 100° C.

Propylene content

Measured by infrared absorption spectroscopy.

Indine value

Measured by a titration method.

100% modulus, tensile strength, break elongation and Shore A hardness

Measured by methods substantially in accordance with JIS K6301.

A random index (R.I.) was used as a measure of random arrangement of ethylene and propylene in the copolymer. From the infrared absorption spectrum of the sample copolymer, the absorption intensity at 730 cm$^{-1}$ (ascribable to the crystallinity of polyethylene) and the absorption intensity at 720 cm$^{-1}$ (ascribable to the skeleton vibration of $+CH_2+_n$) are determined. Let the areas of these absorption intensities be A and B respectively, then R.I. is calculated from the following equation.

$$R.I. (\%) = \frac{Area\ B}{(Area\ A + Area\ B)} \times 100$$

The accompanying drawings are enlarged views of the absorption parts at 720 and 730 cm$^{-1}$ in an infrared absorption spectrum of the copolymer sample for determining R.I. FIG. 2, that of the copolymer of Example 6; FIG. 3, that of the copolymer of Example 12; and FIG. 4, that of the copolymer of Example 21.

EXAMPLE 1

(1) Preparation of the catalyst component (A)

A 200 ml three-necked flask fully dried and purged with nitrogen was charged with 10 millimoles of titanium tetrachloride and 50 ml of n-heptane, and with stirring at room temperature, 15 millimoles of di-n-dodecyl ether was added over 10 minutes. The mixture was further stirred for 1 hour to afford a deep red n-heptane solution of titanium tetrachloride.di-n-dodecyl ether. The solution was cooled to 0° C., and 5 millimoles of tri-i-butyl aluminum was gradually added dropwise over the course of 1 hour. The mixture was heated to 20° C. over the course of 1 hour, and aged at 20° C. for 2 hours to afford a deep brown uniform solution.

(2) Copolymerization

Figure 1:
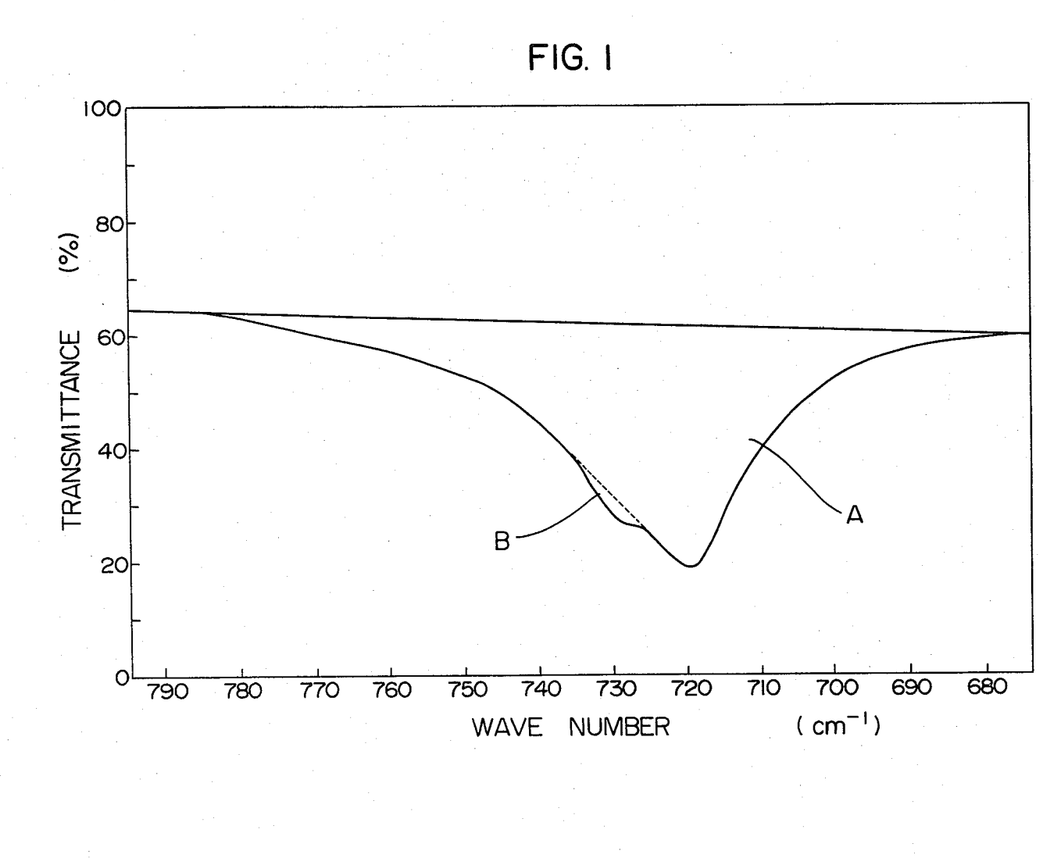
FIG. 1 is an infrared absorption spectral chart of the copolymer of Example 1.

Stirring impellers, a three-way cock, a gas blowing tube and a thermometer were secured to a 3-liter separable flask, and the inside of the flask was fully purged with nitrogen and dried. Into the flask was put 2000 ml of n-hexane dried and dearated with molecular sieves. A gaseous mixture of ethylene (4 liters/min.), propylene (6 liters/min.) and hydrogen (1 liter/min.), dried with molecular sieves, was passed into the flask kept at 35° C. through the gas blowing tube for 10 minutes. Then, 7.0 millimoles of tri-i-butyl aluminum and 0.7 millimole as titanium of the catalyst component (A) were added, and copolymerization was started by passing the aforesaid gaseous mixture at the above flow rates. The temperature of the inside of the polymerization reactor was maintained at 35° C., and the copolymerization was performed for 30 minutes. Methanol (50 ml) was added to the polymer solution to stop the copolymerization. During the copolymerization, the solution was homogeneous, and no precipitation of the copolymer was noted. Water (1 liter) was added, and the solution was well stirred. Subsequent steam stripping afforded a solid rubber. The amount yielded of the copolymer was 58 g. The R. I. value of the copolymer determined from its infrared absorption spectrum shown in FIG. 1 was 1.0%.

The properties of the copolymer obtained by this Example were as follows:

Propylene content: 44% by weight
$ML_{1+4}^{100}$: 68
100% Modulus: 10 kg/cm$^2$
Tensile strength: 33 kg/cm$^2$
Break elongation: 2700%
Shore A hardness: 51

COMPARATIVE EXAMPLE 1

The same copolymerization as in Example 1 was performed except that titanium tetrachloride alone was used instead of the catalyst component (A). During the copolymerization, the copolymer precipitated in a large amount, and the copolymerization proceeded in slurry. The amount of the copolymer yielded was 8 g, and its propylene content was 38% by weight. The R. I. value of the copolymer determined from its infrared absorption spectrum was 3.1%.

COMPARATIVE EXAMPLE 2

The same copolymerization as in Example 1 was performed except that a heptane solution of a complex of titanium tetrachloride and di-n-dodecyl ether (titanium and ether were in equimolar proportions) was used instead of the catalyst component (A). During the copolymerization, a large amount of the copolymer precipitated, and the copolymerization proceeded in slurry. The amount of the copolymer yielded was 6 g, and the propylene content of the polymer was 36% by weight. The R.I. of the copolymer determined from its infrared absorption spectrum was 2.9%.

COMPARATIVE EXAMPLE 3

Solid titanium trichloride was prepared by operating in the same way as in Example 1 except that di-n-dodecyl ether was not added in the preparation of the catalyst component (A). The same copolymerization as in Example 1 was carried out except that the resulting titanium trichloride was used instead of the catalyst component (A). During the copolymerization, a large amount of the copolymer precipitated, and the copolymerization proceeded in slurry. The amount of the copolymer yielded was 14 g. The copolymer had a propylene content of 38% by weight and an R. I. value, determined from its infrared absorption spectrum, of 3.8%.

EXAMPLE 2

The same copolymerization as in Example 1 was carried out except that over a period of 25 minutes form the starting of the copolymerization to a point 5 minutes before its termination, a hexane solution of 5-ethylidene-2-norbornene was fed at a rate of 8 ml/min. (4 millimoles/min. as 5-ethylidene-2-norbornene). During the copolymerization, the solution was homogeneous, and no precipitation of the polymer was noted. The yield of the copolymer was 47 g.

The R. I. value of the copolymer determined from its infrared absorption spectrum was 1.1%.

The properties of the copolymer obtained in this Example were as follows:

Propylene content: 43% by weight
Iodine value: 12
$ML_{1+4}^{100}$: 67
100% Modulus: 11 kg/cm$^2$
Tensile strength: 35 kg/cm$^2$
Break elongation: 2900%
Shore A hardness: 50

EXAMPLE 3

The same copolymerization as in Example 2 was carried out except that dicyclopentadiene was fed at a rate of 4 millimoles/min. instead of the 5-ethylidene-2-norbornene. During the copolymerization, no precipitation of the polymer was noted. The amount of the copolymer yielded was 48 g. The copolymer had a propylene content of 43% by weight, and an iodine value of 12, and an R. I. value determined from its infrared absorption spectrum of 1.0%.

EXAMPLE 4

A catalyst component (A) was prepared in the same was as in Example 1 except that di-n-octyl ether was used instead of the di-n-dodecyl ether. A deep brown homogeneous solution was obtained. The polymerization was performed in the same way as in Example 1 except that the catalyst component (A) so prepared was used. During the polymerization, the solution was homogeneous, and no precipitation of the copolymer was noted. The amount of the copolymer yielded was 43 g, and the copolymer had a propylene content of 42% by weight and an R.I. value determined from its infrared absorption spectrum of 1.2%.

EXAMPLE 5

A catalyst component (A) was prepared in the same way as in Example 1 except that in the preparation of the catalyst component (A) in Example 1, after reduction with 5 millimoles of tri-i-butyl aluminum as a reducing agent, 1 millimole of butyl magnesium iodide (containing 3 millimoles of di-n-octyl ether) prepared by reacting butyl iodide with magnesium metal in di-n-octyl ether was added. The same copolymerization as in Example 1 was performed except that the resulting catalyst component (A) was used. The amount of the copolymer yielded was 83 g, and the copolymer had a propylene content of 46% by weight and an R.I. value determined from its infrared absorption spectrum of 0.9%.

EXAMPLE 6

(1) Preparation of a catalyst component (A)

A 200 ml. three-necked flask, fully dried and purged with nitrogen, was charged with 10 millimoles of titanium tetrachloride and 50 ml of 1,2-dichloroethane, and with stirring at room temperature, 15 millimoles of di-n-octyl ether was added over 10 minutes. The mixture was further stirred for 1 hour to afford a deep red 1,2-dichloroethane solution of a complex of titanium tetrachloride and di-n-octyl ether. The solution was cooled to 0° C., and 5 millimoles of tri-i-butyl aluminum was added dropwise gradually over the course of 1 hour. The temperature was then raised over 1 hour to 20° C., and the solution was aged at 20° C. for 2 hours to afford a deep brown homogeneous solution.

(2) Copolymerization

Figure 2:
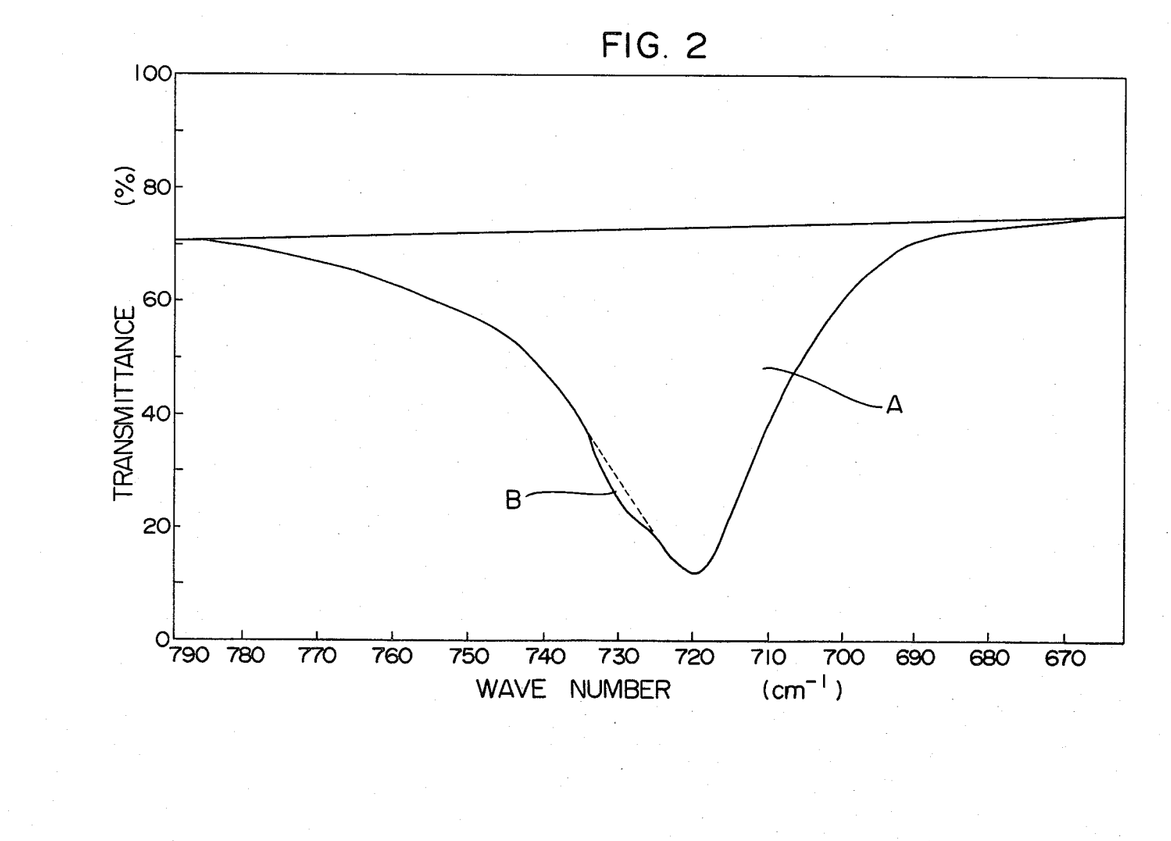

A solid rubbery copolymer was obtained by copolymerizing ethylene and propylene in the same way as in Example 1, (2) except that the catalyst component (A) prepared in Example 6, (1) was obtained. The amount of the copolymer yielded was 45 g, and the copolymer had a propylene content of 42% by weight and an R.I. determined from its infrared absorption spectrum (see FIG. 2) of 0.7%.

The properties of the copolymer obtained by this Example were as follows:

$ML_{1+4}^{100}$: 69
100% Modulus: 10 kg/cm$^2$
Tensile strength: 35 kg/cm$^2$
Break elongation: 2500%
Shore A hardness: 52

EXAMPLE 7

The procedure of Example 6 was repeated except that di-n-butyl ether was used as the ether in the preparation of the catalyst component (A). The amount of the copolymer obtained was 43 g, and the copolymer had a propylene content of 41% and an R.I. value of 0.8%.

EXAMPLE 8

The procedure of Example 6 was repeated except that in the preparation of the catalyst component (A), chlorobenzene was used as the solvent. The amount of the copolymer yielded was 48 g, and the copolymer had a propylene content of 43% and an R.I. value of 0.9%.

EXAMPLE 9

A catalyst component (A) was prepared in the same way as in Example 6. The same copolymerization as in Example 6 was performed except that over a period of 25 minutes from the starting of the copolymerization to a point 5 minutes before its termination, a hexane solution of 5-ethylidene-2-norbornene was fed at a rate of 8 ml/min. (4 millimoles/min. as 5-ethylidene-2-norbornene). The amount of the copolymer yielded was 43 g. The copolymer had a propylene content of 41% by weight, an iodine value of 12, and an R.I. value of 0.7%.

EXAMPLE 10

The same copolymerization as in Example 9 was performed except that dicyclopentadiene instead of 5-ethylidene-2-norbornene was fed at a rate of 4 millimoles/min.

The amount of the copolymer yielded was 43 g, and the copolymer had a propylene content of 41% by weight, an iodine value of 12 and an R.I. of 0.8%.

EXAMPLE 11

A catalyst component (A) was prepared in the same way as in Example 6 except that in the preparation of the catalyst component (A) in Example 6, 5 millimoles of tri-i-butyl aluminum and 6 millimoles of butyl magnesium iodide (dissolved in 3 millimoles of di-n-octyl ether) were simultaneously added. The same copolymerization as in Example 6 was carried out except that the catalyst component (A) so prepared was used.

The amount of the copolymer yielded was 78 g, and the copolymer had a propylene content of 45% by weight and an R.I. value of 0.6%.

EXAMPLE 12

(1) Preparation of a catalyst component (A)

A 200 ml three-necked flask, fully dried and purged with nitrogen, was charged with 10 millimoles of titanium-tetrachloride and 50 ml of 1,2-dichloroethane. The flask was maintained at 0° C., and 10 millimoles as n-butyl magnesium iodide of a di-n-butyl ether solution of n-butyl magnesium iodide was gradually added dropwise with stirring [magnesium/titanium atomic ratio=1.0; ether/titanium mole ratio=3.0]. After the addition, a uniform blackish brown solution formed. The solution was heated to 30° C. over 1 hour, and aged at 30° C. for 1 hour.

(2) Copolymerization

A solid rubbery copolymer was obtained by copolymerizing ethylene and propylene in the same way as in Example 1, (2) except that the flow rate of hydrogen gas in the mixture of ethylene, propylene and hydrogen gas to be fed into the reaction zone was changed to 0.2 liter/min., and the catalyst component (A) prepared in (1) above was used.

Figure 3:
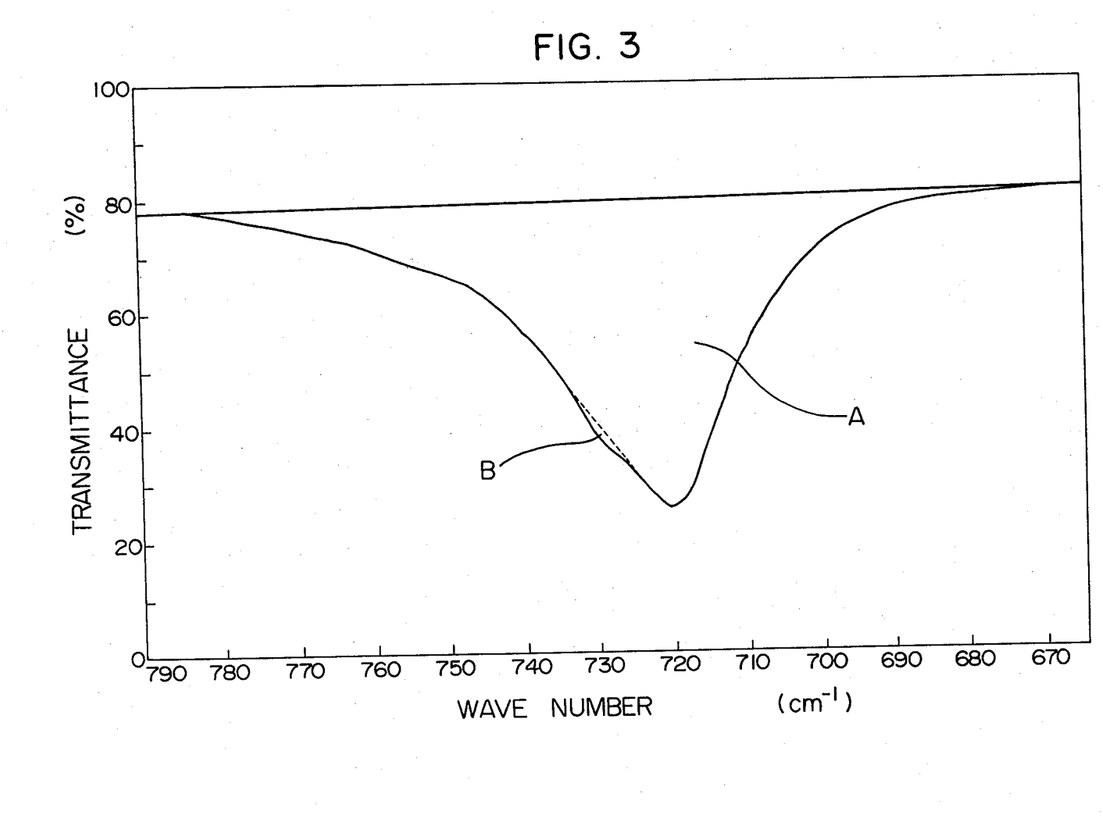

The amount of the copolymer yielded was 124 g, and the copolymer had an R.I. value determined from its infrared absorption spectrum (see FIG. 3) of 0.5%. The properties of the copolymer were as follows:

Propylene content: 47% by weight
$ML_{1+4}^{100}$: 51
100% Modulus: 9 kg/cm$^2$
Tensile strength: 26 kg/cm$^2$
Break elongation: 3100%
Shore A hardness: 48

EXAMPLE 13

The same copolymerization as in Example 12 was carried out except that over a period of 25 minutes from the starting of copolymerization to a point 5 minutes before its termination, a hexane solution of 5-ethylidene-2-norbornene was fed at a speed of 8 ml/min. (4 millimoles/min. as 5-ethylidene-2-norbornene). During the copolymerization, the solution was homogeneous, and no precipitation of the copolymer was noted. The amount of the copolymer yielded was 101 g, and the copolymer had an R.I. value determined from its infrared absorption spectrum of 0.6%.

The properties of the copolymer obtained in this Example were as follows:

Propylene content: 45% by weight
Iodine value: 13
$ML_{1+4}^{100}$: 53
100% Modulus: 10 kg/cm$^2$
Tensile strength: 30 kg/cm$^2$
Break elongation: 3300%
Shore A hardness: 49

EXAMPLE 14

The same copolymerization as in Example 13 was carried out except that dicyclopentadiene was fed at a rate of 4 millimoles/min. instead of the 5-ethylidene-2-norbornene. During the copolymerization, the solution was homogeneous, and no precipitation of the copolymer was noted. The amount of the copolymer yielded was 98 g, and the copolymer had a propylene content of 46% by weight, an iodine value of 13, and an R.I. value determined from its infrared absorption spectrum of 0.6%.

EXAMPLE 15

A catalyst component (A) was prepared in the same way as in Example 12 except that n-butyl magnesium chloride was used instead of the n-butyl magnesium iodide. A blackish brown homogeneous solution was obtained. The same copolymerization was in Example 12 was performed except that the catalyst component (A) so prepared was used. During the copolymerization, the solution was homogeneous, and no precipitation of the copolymer was noted. The amount of the copolymer yielded was 118 g, and the copolymer had an R.I. value determined from its infrared absorption spectrum of 0.8%.

EXAMPLE 16

A catalyst component (A) was prepared in the same way as in Example 12 except that n-butyl magnesium bromide was used instead of the n-butyl magnesium iodide. A blackish brown homogeneous solution was obtained. The same copolymerization as in Example 12 was carried out except that the catalyst component (A) so prepared was used. During the copolymerization, the solution was homogeneous, and no precipitation of the copolymer was noted. The amount of the copolymer yielded was 121 g, and the copolymer had a propylene content of 48% by weight and an R.I. value determined from its infrared absorption spectrum of 0.7%.

EXAMPLE 17

A catalyst component (A) was prepared in the same way as in Example 12 except that diethyl ether was used instead of the di-n-butyl ether. A blackish brown homogeneous solution was obtained. The same copolymerization as in Example 12 was carried out except that the resulting catalyst component (A) was used. During the copolymerization, the yield of the copolymer was 113 g, and the copolymer had a propylene content of 46% by weight, and an R.I. value determined from its infrared absorption spectrum of 0.5%.

EXAMPLE 18

A catalyst component (A) was prepared in the same way as in Example 12 except that di-n-octyl ether was used instead of the din-n-butyl ether. A blackish brown homogeneous solution was obtained. The same copolymerization as in Example 12 was carried out. During the copolymerization, the solution was homogeneous, and the precipitation of the copolymer was noted. The amount of the copolymer yielded was 131 g, and the copolymer has a propylene content of 48% by weight and an R.I. value determined from its infrared absorption spectrum of 0.6%.

EXAMPLE 19

A catalyst component (A) was prepared in the same way as in Example 12 except that ethyl magnesium iodide was used instead of the n-butyl magnesium iodide. A blackish brown homogeneous solution was obtained.

The same copolymerization as in Example 12 was carried out except that the resulting catalyst component (A) was used. During the copolymerization, the solution was homogeneous, and no precipitation of the copolymer was noted. The yield of the copolymer was 119 g, and the copolymer had a propylene content of 47% by weight, and an R.I. value determined from its infrared absorption spectrum of 0.5%.

EXAMPLE 20

A catalyst component (A) was prepared in the same way as in Example 12 except that n-butyl magnesium n-butoxide (synthesized by the method described in Polymer, 1973, vol. 14, 365) was used instead of the n-butyl magnesium iodide. A blackish homogeneous solution was obtained.

The same copolymerization as in Example 12 was carried out except that the resulting catalyst component (A) was used. During the copolymerization, the solution was homogeneous, and no precipitation of the copolymer was noted. The amount of the copolymer yielded was 115 g, and the copolymer had a propylene content of 45% by weight and an R.I. value determined from its infrared absorption spectrum of 0.6%.

EXAMPLE 21

(1) Preparation of a catalyst component (A)

A 100 ml. flask, fully dried and purged with nitrogen, was charged with 50 mg of dry powdery platinum black, 50 ml of 1,2-dichloroethane and 10 millimoles of titanium tetrachloride, and then with stirring, 3.4 ml of n-butyl ether (ether/Ti mole ratio=2.0) was added over 5 minutes. The flask was maintained at 20° C., and hydrogen was blown into the flask at a rate of 0.2 liter/min. for 2 hours. A yellowish black solution formed. The solution was filtered in an atmosphere of nitrogen to separate powdery platinum black. The filtrate was a homogeneous yellowish black solution.

(2) Copolymerization

Figure 4:
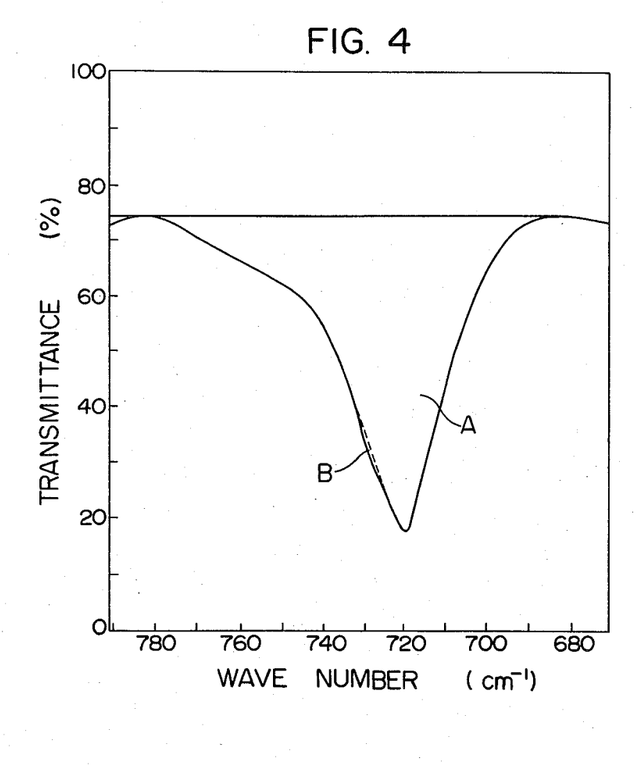

Ethylene and propylene were copolymerized in the same way as in Example 1, (2) except that the flow rate of hydrogen gas in the mixture of ethylene, propylene and hydrogen gas fed into the reaction zone was changed to 0.1 liter/min. and the catalyst component (A) prepared in (1) above was used. During the copolymerization, the solution was homogeneous, and no precipitation of the copolymer was noted. After the termination of the reaction, a small amount of an antioxidant and 1 liter of water were added, and the mixture was stirred. Subsequent steam stripping afforded a solid rubber. The amount of the copolymer obtained yielded was 62 g, and the copolymer had an R.I. value determined from its infrared absorption spectrum (see FIG. 4) of 0.4%.

The properties of the copolymer so obtained were as follows:
Propylene content: 31% by weight
$ML_{1+4}^{100}$: 74
100% Modulus: 12 kg/cm$^2$
Tensile strength: 50 kg/cm$^2$
Break elongation: 3000%
Shore A hardness: 52

EXAMPLE 22

The same copolymerization as in Example 21 was carried out except that over a period of 25 minutes from the start of copolymerization to 5 minutes before its termination, a hexane solution of 5-ethylidene-2-norbornene was fed at a rate of 8 ml/min. (2.09 millimole/min. as 5-ethylidene-2-norbornene). During the copolymerization, the solution was homogeneous, and no precipitation of the copolymer was noted. The amount of the copolymer yielded was 55 g, and the copolymer had an R.I. value determined from its infrared absorption spectrum of 0.6%.

The properties of the resulting copolymer were as follows:
Propylene content: 32% by weight
Iodine value: 18
$ML_{1+4}^{100}$: 73
100% Modulus: 13 kg/cm$^2$
Tensile strength: 68 kg/cm$^2$
Break elongation: 3060%
Shore A hardness: 53

EXAMPLE 23

The same copolymerization as in Example 22 was carried out except that dicyclopentadiene was fed at a rate of 2.09 millimoles/min. instead of 5-ethylidene-2-norbornene. During the copolymerization, the solution was homogeneous, and no precipitation of the copolymer was noted. The amount of the copolymer yielded was 53 g, and the copolymer had a propylene content of 33% by weight, an iodine value of 19 and an R.I. value determined from its infrared absorption spectrum of 0.7%.

EXAMPLE 24

A catalyst component (A) was prepared in the same way as in Example 21 except that 100 mg of palladium carbon powder (containing 5% of palladium) was used instead of the powdery platinum black. A yellowish black homogeneous solution was obtained.

The same copolymerization as in Example 21 was carried out except that the resulting catalyst component (A) was used. During the copolymerization, the solution was homogeneous, and no precipitation of the copolymer was noted. The amount of the copolymer yielded was 64 g, and the copolymer had a propylene content of 35% by weight and an R.I. value determined from its infrared absorption spectrum of 0.4%.

EXAMPLE 25

A catalyst component (A) was prepared in the same way as in Example 21 except that powdery palladium nitrate was used instead of the powdery platinum black. A yellowish black homogeneous solution was used.

The same copolymerization as in Example 21 was carried out except that the resulting catalyst component (A) was obtained. During the copolymerization, the solution was homogeneous, and no precipitation of the copolymer was noted. The amount of the copolymer yielded was 56 g, and the copolymer had a propylene content of 32% by weight and an R.I. value determined from its infrared absorption spectrum of 0.4%.

EXAMPLE 26

A catalyst component (A) was prepared in the same way as in Example 21 except that 50 mg of powdery palladium oxide was used instead of the powdery platinum black. A yellowish black homogeneous solution was obtained.

The same copolymerization as in Example 21 was carried out except that the resulting catalyst component (A) was used. During the copolymerization, the solution was homogeneous, and no precipitation of the copolymer was noted. The amount of the copolymer yielded was 66 g, and the copolymer had a propylene content of 36% by weight and an R.I. value determined from its infrared absorption spectrum was 0.4%.

EXAMPLE 27

(1) Preparation of a catalyst component (A)

A 100 ml. stainless steel autoclave, fully dried and purged with nitrogen, was charged with 1 g of dry powdery Raney cobalt, 50 ml of 1,2-dichloroethane and 10 millimoles of titanium tetrachloride. With stirring, 3.4 ml of n-butyl ether was added over the course of 5 minutes [ether/Ti mole ratio=2.0]. Then, hydrogen was forced into the autoclave under a pressure of 8 kg/cm$^2$, and the reaction was performed at 100° C. for 10 hours. After the reaction, the reaction mixture was filtered in an atmosphere of nitrogen to separate the powdery Raney cobalt. The filtrate was a homogeneous yellowish black solution.

(2) Copolymerization

The same copolymerization as in Example 21 was carried out except that the resulting catalyst component (A) was used. During the copolymerization, the solution was homogeneous, and no precipitation of the copolymer was noted. The amount of the copolymer yielded was 45 g, and the copolymer had a propylene content of 29% by weight and an R. I. value determined from its infrared absorption spectrum of 0.7%.

EXAMPLE 28

A catalyst component (A) was prepared in the same way as in Example 21 except that 700 mg of powdery copper was used instead of the powdery platinum black. A yellowish black uniform solution was obtained.

The same copolymerization as in Example 21 was carried out except that the resulting catalyst component (A) was used. During the copolymerization, the solution was homogeneous, and no precipitation of the copolymer was noted. The amount of the copolymer yielded was 55 g, and the copolymer had a propylene content of 32% by weight and an R. I. value determined from its infrared absorption spectrum of 0.5%.

EXAMPLE 29

Catalyst component (A) was prepared in the same way as in Example 21 except that 700 mg of powdery zinc was used instead of the powdery platinum black. A yellowish black homogeneous solution was obtained.

The same copolymerization as in Example 21 was carried out except that the resulting catalyst component (A) was used. During the copolymerization, the solution was homogeneous, and no precipitation of the copolymer was noted. The amount of the copolymer yielded was 58 g, and the copolymer had a propylene content of 34% by weight and an R. I. value determined from its infrared absorption spectrum of 0.5%.

EXAMPLE 30

A catalyst component (A) was prepared in the same way as in Example 21 except that powdery titanium was used instead of the powdery platinum black. A yellowish black homogeneous solution was obtained.

The same copolymerization as in Example 21 was carried out except that the resulting catalyst component (A) was used. During the copolymerization, the solution was homogeneous, and no precipitation of the copolymer was noted. The amount of the copolymer yielded was 56 g, and the copolymer had a propylene content of 33% by weight and an R. I. value determined from its infrared absorption spectrum of 0.5%.

EXAMPLE 31

A catalyst component (A) was prepared in the same way as in Example 21 except that n-hexane was used instead of the 1,2-dichloroethane, and 7.6 ml of n-octyl ether was used instead of 3.4 ml of n-butyl ether. A yellowish black homogeneous solution was obtained.

The same copolymerization as in Example 21 was carried out except that the resulting catalyst component (A) was used. During the copolymerization, the solution of homogeneous, and no precipitation of the copolymer was noted. The amount of the copolymer yielded was 60 g, and the copolymer had a propylene content of 32% by weight and an R. I. value determined from its infrared absorption spectrum of 0.5%.

EXAMPLE 32

(1) Preparation of a catalyst component (A)

A 100 ml flask, fully dried and purged with nitrogen, was charged with 100 mg of dried powdery palladium.-carbon, 50 ml of 1,2-dichloroethane and 10 millimoles of titanium tetrachloride, and then with stirring, 3.4 ml of n-butyl ether was added over the course of 5 minutes. The inside of the flask was maintained at 10° C., and hydrogen gas was blown into the flask at a rate of 0.2 liter/min. for 2 hours. A yellowish black solution was formed. The solution was filtered in an atmosphere of nitrogen to separate the powdery palladium carbon (containing 5% of palladium). The filtrate was cooled to 0° C., and with stirring, 2 millimoles of n-butyl magnesium iodide was added over 10 minutes as an n-butyl ether (the mole ratio of the n-butyl ether to titanium tetrachloride was 2.6). A blackish brown homogeneous solution was obtained.

(2) Copolymerization

The same copolymerization as in Example 21 was carried out except that the resulting catalyst component (A) was used. During the copolymerization, the solution was homogeneous, and no precipitation of the copolymer was noted. The amount of the copolymer yielded was 113 g, and the copolymer had a propylene content of 37% by weight and an R. I. value determined from its infrared absorption spectrum of 0.3%.

EXAMPLE 33

(1) Preparation of a catalyst component (A)

A 100 ml flask, fully dried and purged with nitrogen, was charged with 100 mg of powdery palladium carbon (containing 5% of palladium), 50 ml of purified 1,2-dichloroethane and 10 millimoles of titanium tetrachloride. With stirring, 2.8 ml of n-butyl ether was added over the course of 5 minutes. The reaction mixture was cooled to 0° C. and with stirring, an n-butyl ether solution of 3 millimoles of n-butyl magensium iodide was added (the mole ratio of the n-butyl ether to titanium tetrachlorde was 2.0). A brown solution was obtained.

Then, hydrogen gas was blown into the solution at a rate of 0.2 liter/min. for 2 hours. The reaction mixture was filtered in an atmosphere of nitrogen to separate the powdery palladium carbon. A blackish brown homogeneous solution was obtained.

(2) Copolymerization

The same copolymerization as in Example 21 was carried out except that the resulting catalyst component (A) was used. During the copolymerization, the solution was homogeneous, and no precipitation of the copolymer was noted. The yield of amount of the copolymer yielded was 120 g, and the copolymer had a propylene content of 39% by weight and an R. I. value determined from its infrared absorption spectrum of 0.2%.

EXAMPLE 34

(1) Preparation of a catalyst component (A)

A 100 ml flask, fully dried and purged with nitrogen, was charged with 50 mg of dried powdery platinum black, 50 ml of 1,2-dichloroethane and 10 millimoles of titanium tetrachloride, and with stirring, 3.4 ml (20 millimoles) of n-butyl ether was added over the course of 5 minutes (ether/titanium mole ratio=2.0). The flask was maintained at 20° C., and hydrogen was introduced at a rate of 0.2 liter/min. for 2 hours. A yellowish black solution formed. The solution was filtered in an atmosphere of nitrogen to separate the powdery platinum black. The filtrate was a homogeneous yellowish black solution.

One milliliter of a 1,2-dichloroethane (1.0 mole/liter) solution of vanadium tetrachloride was added to the solution, and the mixture was stirred at 20° C. for 1 hour to form a catalyst component (A).

(2) Copolymerization

The same copolymerization as in Example 1 was carried out except that the resulting catalyst component (A) was used. The amount of the copolymer yielded was 105 g, and the copolymer had a propylene content of 45% by weight and an R. I. value determined from its infrared absorption spectrum of 0.2%.

What we claim is:

1. In a process for producing a rubbery olefin copolymer which comprises random copolymerization of at least two olefins in the presence of a catalyst composed of (A) a titanium compound and (B) an organometallic compound of a metal of Groups I to III of the periodic table, the improvement wherein the titanium compound (A) is a liquid product obtained by treating a titanium tetrahalide of the general formula $TiX_4$ in which X represents Cl, Br or I in a hydrocarbon, a halogenated hydrocarbon or a mixture of both in the presence of an ether with at least one member selected from the group consisting of (1) an organoaluminum compound, (2) an organomagnesium compound and (3) hydrogen with at least one metal or metal compound, said metal selected from the group consisting of metals of Group IB, IIB, IVB and VIII of the Periodic Table, said ether being represented by the general formula:

$$R^1O R^2$$

wherein $R^1$ and $R^2$, independently form each other, represent an alkyl, alkenyl or aralkyl group having 2-12 carbon atoms with the proviso the alkyl, alkenyl or aralkyl group contains at least 6 carbon atoms if a hydrocarbon is used.

2. The process of claim 1 wherein the treatment of the titanium tetrahalide with the organoaluminum compound and/or organomagnesium compound is carried out by contacting the titanium tetrahalide with the organoaluminum compound and/or the organomagnesium compound at a temperature of from −40° C. to 80° C.

3. The process of claim 2 wherein the amount of the organoaluminum compound and/or organomagnesium compound is 0.2 to 10 moles per mole of the titanium tetrahalide.

4. The process of claim 1 wherein the reducing treatment of the titanium tetrahalide with hydrogen is carried out in the presence of at least one metal or one metal compound of metals selected from Group IB, IIB, IVB or VIII of the periodic table by contacting titanium tetrachloride with a reducing agent selected from the group consisting of (1) hydrogen, (2) a combination of hydrogen and an organoaluminum compound, (3) a combination of hydrogen and an organomagnesium compound and (4) a combination of hydrogen, the organoaluminum compound and the organomagnesium compound at a temperature of from −50° C. to 200° C. and a pressure ranging from atmospheric pressure to 100 kg/cm².

5. The process of claim 4 wherein the amount of the metal or metal compound is 0.00001 to 10 moles per mole of the titanium tetrahalide.

6. The process of claim 4 wherein the amount of the organoaluminum compound or organomagnesium compound is 0.05 to 0.9 mole per mole of the titanium tetrahalide.

7. The process of claim 4 wherein the amount of the sum of the organoaluminum compound and the organomagnesium compound is 0.05 to 0.9 mole per mole of the titanium tetrahalide.

8. The process of claim 1 wherein the amount of the ether is 0.2 to 1.0 moles per mole of the titanium tetrahalide.

9. The process of claim 1 wherein the titanium compound (A) further contains a tetravalent and/or pentavalent vanadium compound soluble in the hydrocarbon or the halogenated hydrocarbon.

10. The process of claim 9 wherein the amount of the vanadium compound is 0.01 to 10 moles per mole of titanium.

11. The process of claim 1 in which the titanium compound is treated in the presence of a hydrocarbon.

12. The process of claim 1 in which the titanium compound is treated in the presence of a halogenated hydrocarbon.

13. The process of claim 1 in which the titanium compound is treated in the presence of a mixture of a hydrocarbon and a halogenated hydrocarbon.

* * * * *